Aug. 16, 1960 J. F. WIGGIN 2,949,561
AUTOMATIC BEAM CURRENT CONTROL
Filed April 28, 1959
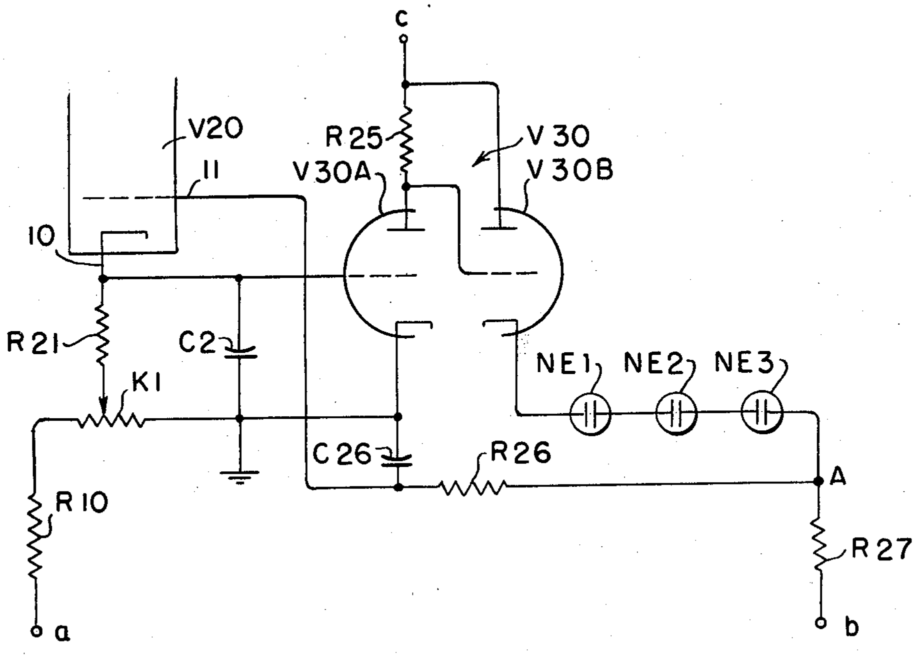
Joseph F. Wiggin
*INVENTOR.*
*BY* Joseph P. Kates
ATTORNEY United States Patent Office 2,949,561

Patented Aug. 16, 1960

2,949,561

AUTOMATIC BEAM CURRENT CONTROL

Joseph F. Wiggin, Skaneateles, N.Y., assignor to General Electric Company, a corporation of New York Filed Apr. 28, 1959, Ser. No. 809,551

11 Claims. (Cl. 315—12)

The present invention relates to a television camera system and more particularly relates to a system of automatic beam current control wherein in a television camera tube such as an image orthicon tube means are provided to effectively prevent beam current drift and allow good picture quality after only one minute of warm-up time.

In camera tube systems of the prior art the scanning beam current drifts from optimum value as the tube initially heats up even though the grid bias is held constant. This effect is apparently due to mechanical expansion of the electron gun parts in the tube itself. As a result good picture quality cannot be obtained until after at least one or two hours of warm-up time unless the grid bias is readjusted repeatedly to compensate for drift. Because of this prior art systems had disadvantages of requiring extra engineering and servicing time prior to going on the air and also immediate operation with good picture quality was impossible thus requiring duplication of equipment. The prior art method of solving the warm-up problem was to continuously adjust the grid bias of the camera tube so as to readjust the beam current to proper values to obtain proper output signals from the camera tube. This required excessive operative time in the warm-up period and it was inconvenient to keep adjusting the grid bias. There was also interference with reception of a proper picture during the period of warm-up time. Also, because of the necessity in prior art cameras for warming up the camera for about two hours before going on the air, an additional two hours of non-productive time of skilled employees were spent during warm-up.

The present invention overcomes these and other disadvantages of the prior art providing savings by eliminating use of personnel for warm-up time and providing means whereby the equipment may be utilized immediately with good reception thus requiring less equipment for a station to maintain.

Accordingly an object of the present invention is to provide for substantially instantaneous use of television camera tubes with good picture quality.

Another purpose of the present invention is to provide for rapid operation of television camera tubes with good picture quality reception and without the necessity for continuous readjustment of grid bias of the tubes.

Another aim of the present invention is to provide an electronic circuit that will effectively prevent beam current drift and thus permit good picture quality after approximately a one minute warm-up period.

Another object of the present invention is to effect savings in personnel and in equipment utilized by providing an automatic beam control system for television camera tubes to prevent drift of scanning beam current during warm-ups.

Another purpose of the present invention is to provide a beam current stabilizing circuit for a television-type camera tube so as to obtain good picture quality reception within less than one minute after the equipment incorporating the tube is turned on and wherein the beam current can be made equal to that beam current desirable when the equipment is thoroughly warmed.

Another aim of the present invention is to provide automatic beam control apparatus wherein cathode current may be related to scanning beam current by a fixed ratio to permit stabilization.

Another object of the present invention is to provide a circuit for automatic beam current control of a camera or similar type tube wherein substantially no change in cathode voltage will result from regulatory action so that focusing and other adjustments are not disturbed.

Another purpose of the present invention is to provide a television camera tube circuit which will be stabilized substantially immediately without necessity for warm-up time of the camera tube and which will provide for temperature compensation with camera tubes having electron guns wherein beam current drifts with temperature.

While the novel and distinctive features of the invention are particularly pointed out in the appended claims, a more expository treatment of the invention, in principle and in detail, together with additional objects and advantages thereof is afforded by the following description and accompanying drawing in which:

The figure is a schematic representation of a preferred embodiment of a camera tube circuit provided with an automatic beam current regulation system in accordance with the present invention.

In television camera tubes such as those of the image orthicon type the scanning beam current drifts from the optimum value as the tube heats up even though the grid bias is held constant. In a test under operating conditions for a typical 5820 tube, the cathode current changed from 1.5 microamperes (adjusted for proper value when fully warmed up) to 7.5 microamperes when turned on cold. This change required a 5 volt grid bias change to readjust the beam current to the proper value. It is thus seen that considerable drift of scanning beam current occurs during warm-up and the change may be so large that picture quality is completely lost and in fact the picture may disappear entirely. Thus, it is necessary to warm-up the equipment for one or two hours before good quality pictures can be obtained or in the alternative to continually readjust the grid bias setting during a substantial part or all of this time. With increased emphasis placed by broadcasting stations on desirability for stable, quick warm-up equipment because of the high cost of operation otherwise, means of the present invention effectively solves the problem and prevents beam current drift thus permitting good picture quality after a one minute warm-up.

Now referring to the figure an image orthicon tube V20 may be provided which for example may be a conventional 5820 image orthicon tube and may have elements comprising a cathode 10 a control electrode or control grid 11 and an anode (not shown). The current from the cathode 10 which is the scanning current in image orthicon tube V20 is generally very small being of the order of magnitude of 0.01 microampere. The cathode of an image orthicon tube is conventionally grounded with the grid bias being adjusted during warm-up time. In accordance with the invention, a potentiometer K1 (or a resistor) may be provided having a resistance portion of the order of 25K ohms (where K=1000 ohms). If desired, a rheostat or a resistor could be utilized for the function accomplished by potentiometer K1. Disposed between one end of the resistance portion of potentiometer K1 and a negative power supply source *a* which may be a minus (—) 105 volts supply may be a resistor R10. Resistor R10 may be a 100K ohm resistor. The other end of the resistance portion of potentiometer K1 may be grounded. Disposed between the sliding contact arm of potentiometer K1 and the cathode of V20 may be a resistor R21. Resistor R21 may be of the order of 4.7 megohms. An RF (radio frequency) bypass capacitor C2 may be provided between the cathode of image orthicon tube V20 and ground and may be of the order of .1 microfarad. A D.C. amplifier V30 may be provided and may be a duo triode comprising a first section or stage V30A and a second section or stage V30B. Each section V30A and V30B may have a cathode, a control electrode and an anode. Output of image orthicon tube V20 may be taken from its cathode and applied to the control electrode of first stage V30A of the D.C. amplifier stage V30. It will be understood, of course, that the other electrodes of the image orthicon tube are not shown for purposes of simplicity and clarity of the drawing. D.C. amplifier V30 comprising stages V30A and V30B may be provided in order to regulate the bias on the grid of the image orthicon tube V20 and also may serve to hold the cathode of stage V20 constant.

In operation of the system upon a small change in cathode current of the image orthicon tube V20, the large value of resistance of 4.7 megohm resistor R21 will cause a relatively large voltage signal to appear at the cathode of tube V20 to reflect this small change in current. This relatively large positive change in cathode voltage at the cathode of stage V20 may be coupled to the control electrode of stage V30A and will cause considerable conduction through stage V30A. Disposed between the anode of stage V30A and a positive source of voltage *c* which may be of the order of positive 280 volts may be a resistor R25. Resistor R25 may be of the order of 470K ohms. The anode of stage V30A may be directly connected to the positive 280 volts source. The anode of stage V30A may be directly coupled to the control electrode of stage V30B. Disposed between the cathode of stage V30A and the control electrode 11 of camera tube V20 may be a capacitor C26 for a purpose which will be described hereinafter. Disposed in series at the cathode of stage V30B may be a plurality of voltage regulating tubes such as, for example, neon tubes NE1, NE2 and NE3. Disposed between a negative 500 volts source *b* and neon lamp or tube NE3 may be a resistor R27 which may be of the order of 390K ohms and have a one watt power rating. Disposed at point A between voltage regulating tube NE3 and resistor R27 and the control electrode 11 of stage V20 may be a resistor R26 which may be of the order of 47K ohms. If desired a resistor or other suitable voltage dropping device may be inserted instead of the neon tubes. The relatively large change in voltage across resistor R21 with change of cathode current of camera tube V20 being coupled to the control electrode of stage V30A this will cause considerable conduction through stage V30A. The change in voltage between the cathode from the negative 105 volts power supply source during the warm-up period will ordinarily be positive as the camera tube warms up and hence the grounded cathode stage V30A will conduct very heavily upon a fairly minute change resulting in increased current in the cathode of the image orthicon tube V20. Heavy conduction through stage V30A causes the voltage at its anode to be lowered considerably. The lowered anode voltage at the anode of stage V30A is directly coupled to the control electrode of stage V30B causing stage V30B to have its flow of current therethrough appreciably reduced or cut off. Resistor R25 which may be disposed between the 280 volt supply source *c* and which may be of the order of 470K ohms comprises the anode load resistor for stage V30A and it is the voltage developed thereacross caused by changes of current therethrough which is coupled to the control electrode of stage V30B. Upon cut off or appreciable reduction of the flow of current through stage V30B considerably less current will flow from the negative 500 volt supply source *b* through the cathode resistor R27. Resistor R26 (which may be of the order of 47K ohms) and capacitor C26 (which may be a .1 microfarad capacitor) together form a filter to filter the output voltage developed across resistor R27. The filter comprising resistor R26 and capacitor C26 also filters out any hum which is caused by the filaments of the D.C. amplifier tube V30. The output signal developed across resistor R27 is coupled through resistor R26 to the control electrode 11 of image orthicon tube V20. This output signal on control electrode 11 provides for the variation in output current of the image orthicon tube V20 necessary to provide proper stabilization for camera tube V20 during the warm-up period. Each of the neon tubes NE1, NE2 and NE3 may provide a voltage drop of about 50 volts. As indicated hereinabove if desired, a resistor or other voltage dropping device may be utilized in place of the three neon tubes in series and the resistor may be of predetermined value to cause the 150 volt drop required thereacross. The cathode of stage V30B because of the tube resistance of stage V30B and because its anode is connected to the positive 280 volts power supply *c* will normally be at 100 volts. Since a voltage approximating minus (−) 50 volts (negative 50 volts) may be desired at point A, it is necessary that an additional voltage drop be inserted between the cathode of stage V30B and point A at the junction of resistors R27 and R26. Each of the neon tubes NE1, NE2 and NE3 provides a voltage drop of about 50 volts, thereby reducing the voltage at point A at the junction between resistor R27 and R26 to the minus (−) 50 volts desired from the plus (+) 100 volts which is at the cathode of stage V30B. In practice, in the emobidment shown it should be understood that the voltage required at the grid control electrode 11 of camera tube V20 can be required to be from 30 to 100 volts, etc.

It is important, however, that the scanning current remain substantially constant during the warm-up period in accordance with the invention and for this reason the control electrode 11 of stage V20 must be very carefully controlled such that a constant scanning current is maintained. Stated briefly, this is accomplished by the cathode circuitry comprising resistor R10, potentiometer K1 and resistor R21 inserted in the cathode of the image orthicon tube V20 and the D.C. amplifier stage V30 and its circuit which causes the control electrode 11 of the image orthicon stage tube V20 to follow changes in cathode current in the image orthicon.

It should be noted that in addition to the above-described functions performed because of the inventive means and method, the circuit shown in the cathode and control electrode of the image orthicon tube V20 also serves to compensate for changes in line voltage or in the power supply which occurs in broadcasting or other similar electronic equipment. Without this feature of the invention, the scanning current can be thrown off and the quality of the picture ruined. For example, despite an appreciable change in the negative 500 volts supply *b* or the positive 280 volts power supply *c*, the cathode and control grid circuit of stage V20 will tend to keep a constant scanning current over a relatively wide range of line voltage fluctuation. The minus (−) 105 volt supply *a* is usually a regulated voltage coming out of a regulated voltage power supply which does not cause this trouble.

Thus, the present invention provides a beam current stabilizing circuit which as shown by test is capable of providing good picture quality within approximately 30 seconds after the equipment is turned on and wherein the beam current can be stabilized substantially immediately at a value that can be chosen when the equipment is thoroughly warm.

Variations can be readily made within the scope of the invention, for example, variations of the regulator circuit and the invention is applicable to various types of tubes using electron guns the beam current of which can drift with temperature.

While a specific embodiment of the invention has been shown and described, it should be recognized that the invention should not be limited thereto. It is accordingly intended in the appended claims to claim all such variations as fall within the true spirit of the invention.

What is claimed is:

1. Means to compensate for drift of scanning beam current during warm-up of a television camera tube, said tube comprising a cathode and a control electrode, said compensating means comprising means to sample the cathode current of said tube to provide a voltage corresponding to but relatively large for relatively minute changes in cathode current, means to amplify and invert said voltage representing said sampled current, and means to couple said amplified and inverted voltage to the control electrode of said tube.

2. The apparatus of claim 1 including a positive and a negative source of voltage for said amplifying and inverting means and wherein said amplifying and inverting means comprises means to stabilize the voltage applied to said amplifying and stabilizing means.

3. In a television camera system a television camera tube comprising a cathode and a control electrode and means to regulate the scanning beam current of said tube said regulating means comprising a cathode voltage supply source, a resistor disposed between said source of cathode voltage and said cathode of magnitude such that relatively minute changes in cathode current provide relatively large changes in this voltage at said cathode, means to amplify said voltage at said cathode, means to invert said amplified voltage and means responsive to said amplified and inverted voltage to apply a voltage to the control electrode of said camera tube to thereby provide for stabilizing of the beam current of said tube over a relatively large range of ambient conditions.

4. In a television broadcasting system comprising a television camera tube, said television camera tube being adapted to provide a scanning beam, and comprising a cathode and a control electrode, a source of negative voltage, a relatively large value resistor disposed between said source of negative voltage and said camera tube cathode, a D.C. amplifier responsive to cathode voltage of said camera tube to amplify and invert voltage of said cathode reflecting changes in cathode current developed across said relatively large value resistor, and means to apply output of said D.C. amplifier to said camera tube control electrode to thereby regulate scanning beam current under varying ambient conditions.

5. A television system comprising a television camera tube and means to prevent drift of scanning beam current in said camera tube, said tube comprising a cathode and a control electrode to thereby control the scanning beam of said television camera tube, a source of negative voltage to supply negative voltage to said cathode, a first resistor, a resistance means and a second resistor disposed between said source of negative voltage and the cathode of said camera tube, said resistance means being adjustable to provide beam current control adjustment, said second resistor being of relatively large dimensions of the order of megohms such that a small change in cathode current will provide a relatively large change in cathode voltage, a D.C. amplifier responsive to output from the cathode of said camera tube, and means to feed the output from said D.C. amplifier to provide a D.C. voltage to the control electrode of said camera tube to thereby permit changes in said cathode current of said camera tube to be reflected by corresponding changes in voltage at said control electrode of said camera tube to thereby maintain relatively constant scanning beam current and prevent drift during changes in ambient conditions particularly occurring during warm-up of said camera tube.

6. The apparatus of claim 5 wherein said D.C. amplifier comprises a first and a second stage having an anode, a control electrode, and a grounded cathode, a source of positive voltage, an anode load resistor disposed between said source of positive voltage and the anode of said first D.C. amplifier stage, signals representing change in cathode current of said television camera tube being coupled to the control electrode of said first stage, said second stage of said D.C. amplifier having its anode connected to said source of positive voltage and having its control electrode directly electrically connected to the anode of said first stage, a second source of negative D.C. voltage, a plurality of voltage dropping resistors and a fourth resistor disposed in series between said second stage cathode and said second negative source of voltage, filter means disposed between said fourth resistor and the control electrode of said camera tube, voltage developed across said fourth resistor being coupled to the control electrode of said camera tube to thereby effect automatic beam current control of said camera tube.

7. In a television system including a television type camera tube, said tube having a control electrode and a cathode, means for providing automatic beam current control for said camera tube, said means comprising a source of negative D.C. voltage, a resistor of the order of several megohms disposed between said source of negative voltage and said cathode, an adjustable beam current control means disposed between said resistor and said source, a D.C. amplifier responsive to voltage at the cathode of said camera tube to amplify and invert the relatively large changes in voltage at the cathode resulting from relatively small changes in cathode current flowing through said several megohm resistor, and means to apply said amplified and inverted signals at a predetermined desired level to the control electrode of said camera tube to thereby control beam current during periods of ambient condition fluctuation which would otherwise cause relatively large variations in scanning current.

8. An automatic beam control sytem for a television camera tube including a control electrode and a cathode, said system comprising a cathode resistor of relatively large dimensions of the order of 4.7 megohms such that relatively small changes in cathode current passing therethrough will cause relatively large changes in cathode voltage, a D.C. amplifier to amplify and invert said change in cathode voltage, filter means to filter said amplified and inverted signals, and means to couple said filtered signals to the control electrodes of said television camera tube to thereby provide for relatively drift-free scanning beam current.

9. The apparatus of claim 8 including voltage dropping means of predetermined value disposed in said D.C. amplifier to provide a higher stabilization factor to thereby accommodate a relatively large range of grid bias values required by said television camera tubes.

10. A circuit for automatic beam current control of an image orthicon tube having a cathode and a control electrode, said circuit comprising a source of negative voltage, a first, a second and a third resistor disposed between the cathode of said image orthicon tube and said negative voltage supply, said second resistor being adjustable, and electrically connected to ground at one end, a D.C. amplifier circuit comprising a first and a second stage, each of said stages comprising an anode, a control electrode and a cathode, the cathode of said first stage being grounded, means to directly couple output from the cathode of said image orthicon tube to the control electrode of the first stage of said D.C. amplifier, a positive source of anode load voltage, an anode load resistor disposed between said positive source and the anode of said first stage, the anode of said second stage being electrically connected to said positive voltage source, connection means to directly connect the anode of said first stage to the control electrode of said second stage, a source of negative voltage which is relatively large in comparison with the voltage of said first source of negative voltage, a second stage cathode load resistor, a plurality of voltage dropping resistances disposed between the cathode of said second D.C. amplifier stage and said cathode load resistor, means to provide filtering of said second stage cathode load resistor output, and means to connect said cathode load resistor through said filter means to said control electrode of said image orthicon tube such that upon cathode current of said orthicon tube variance from predetermined value flowing through said cathode resistances, a D.C. change is coupled from the cathode of said image orthicon tube to the control electrode of the first stage of said D.C. amplifier to thereby cause increased current gain and decreased voltage at its anode, which decreased voltage is coupled to the control electrode of said second stage thereby causing said second stage to be reduced in current flow therethrough, said reduction causing a lowering of potential at the cathode load resistance of said second stage of said D.C. amplifier, which lowered voltage is coupled to the control electrode of said image orthicon tube to thereby change the image orthicon tube scanning beam in accordance with changes in current through the cathode of said image orthicon to thereby provide for relatively constant beam current through said image orthicon tube, the said voltage dropping resistances providing predetermined voltage level for proper coupling to said control electrode of said orthicon tube and permitting a high stabilization factor in connection with the relatively large negative voltage supply to aid the circuit to accommodate the large range of grid bias values required by different image orthicon tubes, said image orthicon tube cathode resistor being of relatively large value thereby providing a substantially large change in cathode voltage with a small change in current therethrough to thereby cause regulatory action in a manner to prevent disturbance of focus and adjustments of said image orthicon tube.

11. A method of preventing drift of scanning beam current during warm-up time of a camera tube, said method comprising sampling the cathode current of said television camera tube, amplifying and inverting changes in sampled current, and applying said changes to the control electrode of said camera tube to thereby cause a constant scanning current to occur despite changes in cathode current during warm-up time.

References Cited in the file of this patent

UNITED STATES PATENTS

| | | |
|---|---|---|
| 2,862,143 | Wilson | Nov. 25, 1958 |
| 2,884,562 | Solow | Apr. 28, 1959 |